US005250346A

United States Patent [19]

Nagai et al.

[11] Patent Number: 5,250,346

[45] Date of Patent: Oct. 5, 1993

[54] THERMAL IMAGE TRANSFER RECORDING MEDIUM

[75] Inventors: Moriyasu Nagai; Yuichi Taka; Tadafumi Tatewaki, all of Numazu; Shigeru Miyajima, Fuji; Yoshihiko Hiyoshi, Shimizu; Youji Ide, Mishima; Nobuyuki Maeda, Susono; Kumi Surizaki; Tetsuji Kunitake, both of Numazu, all of Japan

[73] Assignee: Ricoh Company, Ltd., Tokyo, Japan

[21] Appl. No.: 738,441

[22] Filed: Jul. 31, 1991

[30] Foreign Application Priority Data

| | | | |
|---|---|---|---|
| Jul. 31, 1990 | [JP] | Japan | 2-204598 |
| Nov. 27, 1990 | [JP] | Japan | 2-324067 |
| May 22, 1991 | [JP] | Japan | 3-146871 |
| Jul. 26, 1991 | [JP] | Japan | 3-210158 |

[51] Int. Cl.[5] .......... B32B 9/04

[52] U.S. Cl. .......... 428/195; 428/488.1; 428/488.4; 428/913; 428/914; 428/484

[58] Field of Search .......... 428/195, 484, 488.1, 428/448.4, 913, 914

[56] References Cited

U.S. PATENT DOCUMENTS

| | | | |
|---|---|---|---|
| 4,053,660 | 10/1977 | Hurwitz et al. | 427/153 |
| 4,707,406 | 11/1987 | Inaba et al. | 428/336 |
| 4,828,922 | 5/1989 | Koshizuka et al. | 428/412 |

*Primary Examiner*—George F. Lesmes
*Assistant Examiner*—Elizabeth Evans
*Attorney, Agent, or Firm*—Oblon, Spivak, McClelland, Maier & Neustadt

[57] ABSTRACT

A thermal image transfer recording medium is composed of a support and a thermofusible ink layer formed on the support, with the water-content ratio of the recording medium excluding the support being in the range of 0.3 to 4.0 wt. % of the total weight of the recording medium excluding the support.

15 Claims, 1 Drawing Sheet

THERMAL IMAGE TRANSFER RECORDING MEDIUM

BACKGROUND OF THE INVENTION

1. Field of the Invention

The present invention relates to a thermal image transfer recording medium comprising a support and a thermofusible ink layer formed thereon, comprising as the main components a coloring agent and a binder agent, which is capable of yielding excellent transferred images on any image-receiving sheet, and suitable for use with printers for computers and word processors, and a bar code printer.

2. Discussion of Background

Recently a thermal image transfer recording system using a thermal head is widely used because of the advantages that it is noiseless, the apparatus for use in the system is relatively inexpensive and can be made small in size, the maintenance is easy, and printed images are stable in quality.

Representative examples of thermal image transfer recording media for use with such a thermal image transfer recording system are as follows:

(1) A thermal image transfer recording medium comprising a support and a thermofusible ink layer which is directly provided on the support, and comprises a coloring agent and a binder agent.

(2) A thermal image transfer recording medium in which a release layer and a thermofusible ink layer are successively overlaid on a support. The release layer essentially consists of a wax component, while the thermofusible ink layer essentially consists of a coloring agent and a binder agent.

However, the above-mentioned conventional thermal image transfer recording media still have the shortcomings in the image transfer ratio and the resolution of the transferred image, depending on the structure of the layers and the kind of the constituents of the recording medium.

More specifically, the ink layer and the release layer of the aforementioned thermal image transfer recording media (1) and (2) are prepared by the hot-melt coating of the constituents such as a wax, a resin or a coloring agent, or by coating a solution or dispersion of those constituents which are dissolved or dispersed in an aqueous or nonaqueous solvent and completely removing the solvent component such as water or an organic solvent. Therefore, the thermofusible ink layer and the release layer are lipophilic, while an image-receiving sheet to which an image is to be transferred from the thermal image transfer recording medium is hydrophilic. As a result, the affinity of the ink contained in the thermofusible ink layer for the image-receiving sheet is decreased, so that the image transfer efficiency is lowered and partial missing of printed images is induced.

Furthermore, when the image-receiving sheet is a sheet of synthetic paper, for example, prepared by kneading a lublicant into a polyethylene film, such as a commercially available synthetic paper "Yupo" (Trademark), made by Oji-Yuka Synthetic Paper Co., Ltd., which easily absorbs the water content, it is considerably difficult to successfully transfer an ink component mainly comprising the oil-type wax to that kind of image-receiving sheet.

To solve the above shortcomings, there is proposed a thermal image transfer recording medium which comprises a thermofusible ink layer containing a polyhydric alcohol, as disclosed in Japanese Laid-Open Patent Application 58-129074. When images are transferred to a sheet of paper with a rough surface by using the above-mentioned thermal image transfer recording medium, voids easily occur. In the case where a sheet of synthetic paper is used as an image-receiving sheet, the image cannot satisfactorily be transferred to the image-receiving sheet and, in addition, a portion of the thermofusible ink layer to which the thermal energy from a thermal head is not applied is also transferred to the image-receiving sheet.

SUMMARY OF THE INVENTION

It is therefore an object of the present invention to provide a thermal image transfer recording medium, capable of yielding a high quality transferred image on any image-receiving sheet such as a sheet of rough paper and synthetic paper, free from the problem of peeling of non-heated portions of the thermofusible ink layer off the support in the course of printing.

The above object of the present invention can be achieved by a thermal image transfer recording medium comprising a support and a thermofusible ink layer formed thereon, with the water-content ratio of the recording medium excluding the support being in the range of 0.3 to 4.0 wt. % of the total weight of the recording medium excluding the support.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

With reference to the accompanying drawings, the present invention will now be explained in more detail.

Figure 1:
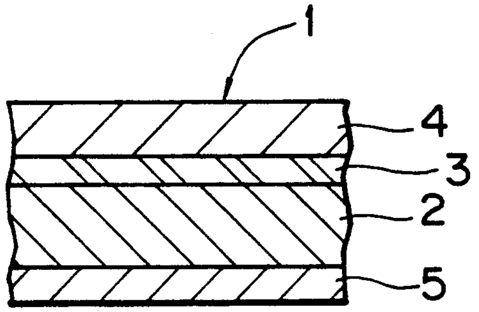
FIG. 1 is a schematic cross-sectional view of an example of a thermal image transfer recording medium according to the present invention.
Figure 2:
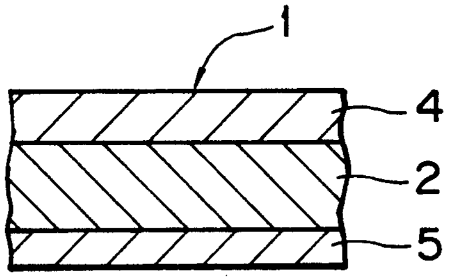
FIG. 2 is a schematic cross-sectional view of another example of a thermal image transfer recording medium according to the present invention.

FIGS. 1 and 2 are schematic cross-sectional views of a thermal image transfer recording medium according to the present invention. In a thermal image transfer recording medium 1 as shown in FIG. 2, a thermofusible ink layer 4 is formed on a support 2 and a heat-resistant protective layer 5 is formed on the back side of the support 2, the opposite side to the thermofusible ink layer 4. In FIG. 1, a release layer 3 is further interposed between a support 2 and a thermofusible ink layer 4.

The support 2 can be made of, for example, a film of heat resistant plastic materials such as polyester, polycarbonate, triacetyl cellulose, nylon and polyimide; glassine paper, condenser paper, and metallic foils. It is preferable that the support 2 have a thickness of about 2 to 16 μm, more preferably about 3 to 10 μm.

In the thermal image transfer recording media 1 according to the present invention as shown in FIGS. 1 and 2, a heat-resistant protective layer 5 may be provided on the back side of the support 2, opposite to the thermofusible ink layer 4, with which a thermal head comes into contact. By means of the heat-resistant protective layer 5, the heat resistance of the support 2 can be improved and the material which is conventionally considered to be unsuitable for the support 2 are available.

Examples of the materials for the heat-resistant protective layer include silicone resin, fluoroplastic, polyimide resin, epoxy resin, phenolic resin, melamine resin and nitrocellulose.

When the release layer is interposed between the support and the thermofusible ink layer as shown in FIG. 1, the release layer comprises at least one of a wax component, a resin component or an unvulcanized rubber.

Examples of the wax component for use in the release layer include natural waxes such as carnauba wax, candelilla wax, beeswax, Japan wax, montan wax and spermaceti; synthetic waxes such as paraffin wax, microcrystalline wax, oxidized wax and polyethylene wax; higher fatty acids such as margaric acid, lauric acid, myristic acid, palmitic acid, stearic acid and behenic acid, and metallic salts thereof; higher alcohols such as stearyl alcohol and behenyl alcohol; esters such as a fatty ester of sorbitan; and amides such as stearic amide and oleic amide.

Examples of the resin component for use in the release layer are polyamide resin, polyester resin, polyurethane resin, vinyl chloride resin, cellulose-based resin, petroleum resin, styrene resin, butyral-based resin, terpene resin, phenolic resin, ethylene-vinyl acetate copolymer and ethylene-acrylic resin.

Examples of the unvulcanized rubber for use in the release layer include polyisoprene rubber, polybutadiene rubber, styrene-butadiene rubber, nitrile rubber, ethylene-propylene rubber, butyl rubber, silicone rubber, fluororubber and urethane rubber. Of these rubbers, polyisoprene rubber, polybutadiene rubber, ethylene-propylene rubber, butyl rubber and nitrile rubber are preferably used.

The release layer may be formed on the support by hot-melt coating. Alternatively, one of the above-mentioned resin component, wax component or unvulcanized rubber is dissolved or dispersed in an appropriate solvent or dispersed in water, and the resultant coating liquid may be coated on the support and dried. It is preferable that the release layer be deposited on the support in an amount ranging from 0.3 to 5 $g/m^2$, and more preferably in the range from 0.5 to 3 $g/m^2$.

It is preferable that the thickness of the release layer be in the range of 0.5 to 10 $\mu m$, and more preferably in the range of 1 to 3 $\mu m$.

The thermofusible ink layer 4 comprises as the main components a coloring agent, a wax component, and a resin component. The thermofusible ink layer 4 may be of double-layered type.

As the coloring agent for use in the thermofusible ink layer 4, dyes and pigments which are conventionally employed in this field can be employed.

Examples of the wax component for use in the thermofusible ink layer include wax-like materials, such as paraffin wax, microcrystalline wax, oxidized paraffin wax, candelilla wax, carnauba wax, montan wax, cersine wax, polyethylene wax, oxidized polyethylene wax, castor wax, beef tallow hardened oil, lanolin, Japan wax, sorbitan stearate, sorbitan palmitate, stearyl alcohol, polyamide wax, oleic amide, stearic amide, hydroxystearic acid, synthesized ester wax, and synthesized alloy waxes.

Examples of the resin component for use in the thermofusible ink layer include polyamide resin, polyester resin, polyurethane resin, vinyl chloride resin, cellulose-based resin, petroleum resin, styrene resin, butyral-based resin, terpene resin, phenolic resin, ethylene-vinyl acetate copolymer, and ethylene-acrylic resin.

The thermofusible ink layer 4 can be prepared by hot-melting coating. Alternatively, the above-mentioned components are dissolved or dispersed in an appropriate solvent to prepare a coating liquid, and the thus prepared coating liquid may be coated and dried. It is preferable that the thermofusible ink layer be deposited on the support or the release layer in an amount ranging from 1 to 10 $g/m^2$, and more preferably in the range from 1 to 3 $g/m^2$.

In order to transfer the images to any image-receiving sheet such as rough paper or synthetic paper free from the peeling problem of the non-heated portions of the thermofusible ink layer of the thermal image transfer recording medium, the water-content ratio of the thermal image transfer recording medium of the present invention excluding the support is controlled to be in the range of 0.3 to 4.0 wt. % of the total weight of the recording medium excluding the support after the recording medium is prepared by drying.

As the method for controlling the water-content ratio of the thermal image transfer recording medium, it is desirable that an aqueous-type coating liquid be employed for the ink layer and the release layer and the water content in each layer be controlled by adjusting the drying condition or performing the moisture conditioning. Alternatively, a hydrophobic-type coating liquid may be employed for the ink layer and the release layer. In such a case, each coating liquid may be coated and dried, followed by the moisture conditioning.

Furthermore, to retain the water-content ratio of the recording medium excluding the support in the range of 0.3 to 4.0 wt. %, at least one of the thermofusible ink layer or the release layer may comprise a material which is capable of adsorbing the moisture.

Preferable examples of the moisture-adsorbing material capable of adsorbing water are polyhydric alcohols including dihydric alcohols and trihydric alcohols, such as ethylene glycol, polyethylene glycol, glycol and glycerin; polyalkyl ether, salts of aliphatic amine and quaternary ammonium salt. Of these, ethylene glycol is most preferably used.

When the water-content ratio of the recording medium excluding the support is less than 0.3 wt. % after preparation of the recording medium, the wetting characteristics of the image-receiving sheet is not increased, so that the image transfer efficiency is not improved.

On the other hand, when the water-content ratio exceeds 4.0 wt. %, the peeling problem of non-heated portions of the thermofusible ink layer frequently occurs in the case where a sheet of rough paper is used as the image-receiving sheet. In addition when the synthetic paper is used as the image-receiving sheet, the image transfer efficiency is considerably decreased.

In the present invention, the water-content ratio of the recording medium excluding the support of the total weight of the recording medium excluding the support is measured by the following method. The method to be described below is adopted to the case where the recording medium comprises a support, a thermofusible ink layer and a heat-resistant protective layer as shown in FIG. 2.

A sample of the thermal image transfer recording medium according to the present invention with an area of 15 $m^2$ is first allowed to stand at 20° C. and 60% RH for 5 hours in order to settle down the water content therein. Thereafter, this sample is accurately weighed (to four places of decimals) to obtain a weight (a). This sample is allowed to stand in a dryer of 100±5° C. for 3 hours and cooled to room temperature. Thereafter, the sample is accurately weighed (to four places of decimals) to obtain a weight (b). Further, the sample is allowed to stand in a dryer of 100±5° C. for one hour and cooled to room temperature. Thereafter, the sample is accurately weighed (to four places of decimals) to obtain a weight (c). The above operation is repeated until the value of (b−c) reaches 0.0010 g or less. When the value of (b−c) attains to 0.0010 g or less, the weight (c) is regarded as a constant weight. This weight of the recording medium is supposed to be a weight (d).

To obtain the weight ratio of the coating weight for the thermofusible ink layer to the entire weight of the recording medium, a sample of the recording medium with an area of 1 $m^2$ is first accurately weighed (to four places of decimals) to obtain a weight (e). Thereafter, the thermofusible ink layer is wiped off the support with an organic solvent such as toluene or methyl ethyl ketone. After the removal of the thermofusible ink layer from the recording medium, the remaining support and the heat-resistant protective layer are accurately weighed (to four places of decimals) to obtain a weight (f). As a result, the weight of the thermofusible ink layer (g) can be obtained from (e−f). Therefore, the weight ratio (h) of the coating weight for the thermofusible ink layer to the entire weight of the recording medium is obtained from the formula of g/e.

Hence, the weight ratio (i) of volatiles to the weight of the thermofusible ink layer can be calculated from the following formula:

$$i=(a-d)/(a\times h)$$

Then, the water-content ratio (j) to the volatiles is measured by quantitative analysis using a commercially available gas chromatography.

Consequently, the water-content ratio in the thermofusible ink layer to the weight of the thermofusible ink layer can be obtained from the formula of $i\times j$.

The features of the present invention will become apparent in the course of the following description of exemplary embodiments which are given for illustration of the invention and are not intended to be limiting thereof.

EXAMPLE 1

Formation of Release Layer

A mixture with the following formulation (A) was coated on a polyethylene terephthalate (PET) film with a thickness of about 4.5 μm by a wire bar at a deposition amount of about 2.0 g/$m^2$ on a dry basis and then the coated liquid was dried. Thus, a release layer was formed on the support.

| Formulation (A) | Parts by Weight |
|---|---|
| Carnauba wax | 8 |
| Butyl rubber | 2 |
| Toluene | 90 |

Formation of Thermofusible Ink layer

A mixture with the following formulation (B) was coated on the above-prepared release layer by a wire bar at a deposition amount of about 2.0 g/$m^2$ on a dry basis and then the coated liquid was dried at 70° C. for 2 minutes. Thus, a thermofusible ink layer was formed on the release layer.

Thus, a thermal image transfer recording medium according to the present invention was obtained. The water-content ratio of the total weight of the release layer and the thermofusible ink layer was 0.8 wt. %.

| Formulation (B) | Parts by Weight |
|---|---|
| Aqueous dispersion of carbon black (Solid content of 20 wt. %) | 95 |
| Aqueous dispersion of carnauba wax (Solid content of 30 wt. %) | 250 |
| Aqueous dispersion of hydrogenerated terpene resin (Solid content of 30 wt. %) | 20 |
| Water | 75 |
| Methanol | 60 |

The above-mentioned aqueous dispersion of carnauba wax in the formulation (B) was prepared by the following method.

A mixture of 27 parts by weight of carnauba wax and 3 parts by weight of a commercially available anionic emulsifying agent "HLB14" (Trademark) was fused at 90° C. To the above mixture, 70 parts by weight of hot water was added with stirring and the resultant mixture was dispersed in a disperser to form a pre-emulsion. Thereafter, the mixture was emulsified in a high-pressure homogenizer, and rapidly cooled by using water. Thus, an aqueous dispersion of carnauba wax was obtained.

EXAMPLE 2

Formation of Release Layer

A mixture with the following formulation (C) was coated on a polyethylene terephthalate (PET) film with a thickness of about 4.5 μm by a wire bar at a deposition amount of about 2.0 g/$m^2$ on a dry basis and then the coated liquid was dried. Thus, a release layer was formed on the support.

| Formulation (C) | Parts by Weight |
|---|---|
| Carnauba wax | 9 |
| Ethylene - vinyl acetate copolymer | 1 |
| Toluene | 90 |

Formation of Thermofusible Ink layer

A mixture with the following formulation (D) was coated on the above-prepared release layer by a wire bar at a deposition amount of about 2.0 g/$m^2$ on a dry basis and then the coated liquid was dried at 70° C. for 2 minutes. Thus, a thermofusible ink layer was formed on the release layer.

Thus, a thermal image transfer recording medium according to the present invention was obtained. The water-content ratio of the total weight of the release layer and the thermofusible ink layer was 2.0 wt. %.

| Formulation (D) | Parts by Weight |
|---|---|
| Aqueous dispersion of carbon black (Solid content of 20 wt. %) | 75 |
| Aqueous dispersion of candelilla wax (Solid content of 30 wt. %) | 250 |
| n-octyl ammonium sulfate | 10 |
| Water | 100 |
| Methanol | 65 |

EXAMPLE 3

The procedure for preparation of the thermal image transfer recording medium in Example 1 was repeated except that the mixture with the formulation (B) for the thermofusible ink layer used in Example 1 was replaced by a mixture with the formulation (E), and that the water-content ratio of the total weight of the release layer and the thermofusible ink layer was changed to 1.7 wt. %. Thus, a thermal image transfer recording medium according to the present invention was obtained.

| Formulation (E) | Parts by Weight |
|---|---|
| Aqueous dispersion of carbon black (Solid content of 20 wt. %) | 75 |
| Aqueous dispersion of candelilla wax (Solid content of 30 wt. %) | 250 |
| Polyethylene glycol (Molecular weight of 1,000) | 10 |
| Water | 100 |
| Methanol | 65 |

EXAMPLE 4

The procedure for preparation of the thermal image transfer recording medium in Example 1 was repeated except that the mixture with the formulation (B) for the thermofusible ink layer used in Example 1 was replaced by a mixture with the formulation (F), and that the water-content ratio of the total weight of the release layer and the thermofusible ink layer was changed to 1.4 wt. %. Thus, a thermal image transfer recording medium according to the present invention was obtained.

| Formulation (F) | Parts by Weight |
|---|---|
| Aqueous dispersion of carbon black (Solid content of 20 wt. %) | 75 |
| Aqueous dispersion of carnauba wax (Solid content of 30 wt. %) | 200 |
| Aqueous dispersion of candelilla wax (Solid content of 30 wt. %) | 50 |
| Ethylene glycol | 10 |
| Water | 100 |
| Methanol | 65 |

EXAMPLE 5

Formation of Thermofusible Ink Layer

A mixture with the following formulation (G) was coated on a polyethylene terephthalate (PET) film with a thickness of about 4.5 $\mu m$ by a wire bar at a deposition amount of about 3.0 $g/m^2$ on a dry basis and then the coated liquid was dried, so that a thermofusible ink layer was formed on the support. Thus, a thermal image transfer recording medium according to the present invention was obtained. The water-content ratio of the total weight of the thermofusible ink layer was 1.5 wt. %.

| Formulation (G) | Parts by Weight |
|---|---|
| Aqueous dispersion of carbon black (Solid content of 20 wt. %) | 95 |
| Aqueous dispersion of carnauba wax (Solid content of 30 wt. %) | 210 |
| Aqueous dispersion of candelilla wax (Solid content of 30 wt. %) | 20 |
| Ethylene glycol | 10 |
| Surface active agent (quaternary ammonium salt type) | 2 |
| Water | 163 |

EXAMPLE 6

Formation of Release Layer

A mixture with the following formulation (A) was coated on a polyethylene terephthalate (PET) film with a thickness of about 4.5 $\mu m$ by a wire bar at a deposition amount of about 2.0 $g/m^2$ on a dry basis and then the coated liquid was dried. Thus, a release layer was formed on the support.

| Formulation (A) | Parts by Weight |
|---|---|
| Carnauba wax | 8 |
| Butyl rubber | 2 |
| Toluene | 90 |

Formation of Thermofusible Ink layer

A mixture with the following formulation (H) was dissolved and dispersed at 120° C. to prepare a coating liquid. The thus prepared coating liquid was coated on the above-prepared release layer by the hot-melt coating method at a deposition amount of about 1.5 $g/m^2$ on a dry basis. Thus, a thermofusible ink layer was formed on the release layer. The thus obtained recording medium was allowed to stand in a desiccator containing water therein for 24 hours.

Thus, a thermal image transfer recording medium according to the present invention was obtained. The water-content ratio of the total weight of the release layer and the thermofusible ink layer was 1.2 wt. %.

| Formulation (H) | Parts by Weight |
|---|---|
| Carbon black | 15 |
| Carnauba wax | 60 |
| Terpene resin | 10 |
| Ethylene glycol | 10 |
| Surface active agent (quaternary ammonium salt type) | 5 |

EXAMPLE 7

Formation of Release Layer

A mixture with the following formulation (I) was coated on a polyethylene terephthalate (PET) film with a thickness of about 4.5 $\mu m$ by a wire bar at a deposition amount of about 1.5 $g/m^2$ on a dry basis and then the coated liquid was dried at 50° C. for 2 minutes. Thus, a release layer was formed on the support.

| Formulation (I) | Parts by Weight |
|---|---|
| Aqueous dispersion of a mixture of carnauba wax and candelilla wax (weight ratio of 8:2) (Solid content of 30 wt. %) | 475 |
| Aqueous dispersion of ethylene - vinyl acetate copolymer (Solid content of 50 wt. %) | 15 |
| Water | 850 |

Formation of Thermofusible Ink layer

A mixture with the following formulation (B) was coated on the above-prepared release layer by a wire bar at a deposition amount of about 2.0 $g/m^2$ on a dry basis and then the coated liquid was dried at 70° C. for 2 minutes. Thus, a thermofusible ink layer was formed on the release layer.

Thus, a thermal image transfer recording medium according to the present invention was obtained. The water-content ratio of the total weight of the release layer and the thermofusible ink layer was 3.7 wt. %.

| Formulation (B) | Parts by Weight |
|---|---|
| Aqueous dispersion of carbon black (Solid content of 20 wt. %) | 95 |
| Aqueous dispersion of carnauba wax (Solid content of 30 wt. %) | 250 |
| Aqueous dispersion of hydrogenerated terpene resin (Solid content of 30 wt. %) | 20 |
| Water | 75 |
| Methanol | 60 |

COMPARATIVE EXAMPLE 1

The procedure for preparation of the thermal image transfer recording medium in Example 1 was repeated except that the mixture with the formulation (B) for the thermofusible ink layer was dried at 70° C. for 3 hours. Thus, a comparative image transfer recording medium was obtained. The water-content ratio of the total weight of the release layer and the thermofusible ink layer was 0.2 wt. %.

COMPARATIVE EXAMPLE 2

The procedure for preparation of the thermal image transfer recording medium in Example 2 was repeated except that the amount of n-octyl ammonium sulfate in the formulation (D) for the thermofusible ink layer was changed from 10 to 35 parts by weight, and that the mixture with the formulation (D) for the thermofusible ink layer was dried at an ordinary room temperature of 25° C. Thus, a comparative image transfer recording medium was obtained. The water-content ratio of the total weight of the release layer and the thermofusible ink layer was 4.2 wt. %.

COMPARATIVE EXAMPLE 3

The procedure for preparation of the thermal image transfer recording medium in Example 3 was repeated except that the amount of polyethylene glycol in the formulation (E) for the thermofusible ink layer was changed from 10 to 25 parts by weight, and that the mixture with the formulation (E) for the thermofusible ink layer was dried at an ordinary room temperature of 25° C. Thus, a comparative image transfer recording medium was obtained. The water-content ratio of the total weight of the release layer and the thermofusible ink layer was 4.6 wt. %.

Bar code printing and black solid printing were separately conducted on an image-receiving sheet A, that is, a commercially available synthetic paper "Yupo" (Trademark), made by Oji-Yuka Synthetic Paper Co., Ltd., and an image-receiving sheet B, that is, a commerically available light-coated paper "New Age 55" (Trademark), made by Kanzaki Paper Manufacturing Co., Ltd., by use of each of the above prepared thermal image transfer recording media and a commercially available thermal image transfer simulator at a printing speed of 76 mm/s. The thermal energy applied to the image-receiving sheet A was 13 $mJ/mm^2$, and that to the image-receiving sheet B was 16 $mJ/mm^2$.

The results are shown in the following Table 1.

TABLE 1

| | Image-receiving Sheet | Peeling of Non-heated Portions of Ink Layer | Defective Image Transfer | Image Density (%) | PCS Value (%) | Bar Code Readable Ratio (%) |
|---|---|---|---|---|---|---|
| Ex. 1 | A | Absent | Absent | 2.01 | 92 | 100 |
| | B | " | " | 1.63 | 91 | 100 |
| Ex. 2 | A | " | " | 1.99 | 92 | 100 |
| | B | " | " | 1.58 | 91 | 100 |
| Ex. 3 | A | " | " | 2.02 | 92 | 100 |
| | B | " | " | 1.62 | 91 | 100 |
| Ex. 4 | A | " | " | 2.00 | 92 | 100 |
| | B | " | " | 1.61 | 91 | 100 |
| Ex. 5 | A | " | " | 2.12 | 92 | 100 |
| | B | " | " | 1.65 | 91 | 100 |
| Ex. 6 | A | " | " | 2.03 | 92 | 100 |
| | B | " | " | 1.70 | 91 | 100 |
| Ex. 7 | A | Absent | Absent | 2.00 | 92 | 100 |
| | B | " | " | 1.60 | 91 | 100 |
| Comp. Ex. 1 | A | Slightly observed | Present | 1.52 | 83 | 75 |
| | B | Slightly observed | Absent | 0.46 | 88 | 85 |
| Comp. Ex. 2 | A | Present | " | 0.30 | 47 | 10 |
| | B | " | " | 1.42 | 82 | 73 |
| Comp. Ex. 3 | A | Slightly observed | Present | 0.86 | 68 | 42 |

TABLE 1-continued

| Image-receiving Sheet | Peeling of Non-heated Portions of Ink Layer | Defective Image Transfer | Image Density (%) | PCS Value (%) | Bar Code Readable Ratio (%) |
|---|---|---|---|---|---|
| B | Slightly observed | " | 1.50 | 81 | 73 |

In the above table, the defective image transfer was evaluated by visual inspection. The PCS value and the bar code readable ratio were measured by scanning a laser beam over the printed bar code by a laser beam check LC-2811 (made by Symbol Technologies, Inc.) and counting the times at which the bar code can be correctly read. The ratio is shown by percentage. The image density was measured by a Mcbeth densitometer RD-914 (made by Kollmorgen Corporation).

The results shown in the above Table 1 indicate that any of the thermal image transfer recording media according to the present invention is excellent in the performance of image transfer and is capable of yielding images both on the rough paper and the synthetic paper free from the peeling problem of the non-heated portions of the thermofusible ink layer.

What is claimed is:

1. A thermal image transfer recording medium comprising a support and a thermofusible ink layer formed on said support, with the water-content ratio of said recording medium excluding said support being in the range of 0.3 to 4.0 wt. % of the total weight of said recording medium excluding said support.

2. The thermal image transfer recording medium as claimed in claim 1, further comprising a release layer, interposed between said support and said thermofusible ink layer.

3. The thermal image transfer recording medium as claimed in claim 1, wherein said thermofusible ink layer comprises a moisture-adsorbing material capable of adsorbing water so as to maintain said water-content ratio in the range of 0.3 to 4.0 wt. % of the total weight of said recording medium excluding said support.

4. The thermal image transfer recording medium as claimed in claim 3, wherein said moisture-adsorbing material is selected from the group consisting of polyhydric alcohols, polyalkyl ether, salts of aliphatic amine and quaternary ammonium salt.

5. The thermal image transfer recording medium as claimed in claim 4, wherein said moisture-adsorbing material is ethylene glycol.

6. The thermal image transfer recording medium as claimed in claim 2, wherein at least one of said thermofusible ink layer or said release layer comprises a moisture-adsorbing material capable of adsorbing water so as to maintain said water-content ratio in the range of 0.3 to 4.0 wt. % of the total weight of said recording medium excluding said support.

7. The thermal image transfer recording medium as claimed in claim 6, wherein said moisture-adsorbing material is selected from the group consisting of polyhydric alcohols, polyalkyl ether, salts of aliphatic amine and quaternary ammonium salt.

8. The thermal image transfer recording medium as claimed in claim 7, wherein said moisture-adsorbing material is ethylene glycol.

9. The thermal image transfer recording medium as claimed in claim 2, wherein said release layer comprises at least one of a wax component, a resin component or an unvulcanized rubber.

10. The thermal image transfer recording medium as claimed in claim 2, wherein said release layer has a thickness ranging from 0.5 to 10 $\mu$m.

11. The thermal image transfer recording medium as claimed in claim 2, wherein said release layer is deposited on said support in an amount ranging from 0.3 to 5 $g/m^2$.

12. The thermal image transfer recording medium as claimed in claim 1, wherein said thermofusible ink layer comprises a coloring agent, a wax component and a resin component.

13. The thermal image transfer recording medium as claimed in claim 1, wherein said thermofusible ink layer deposited is in an amount ranging from 1 to 10 $g/m^2$.

14. The thermal image transfer recording medium as claimed in claim 1, further comprising a heat-resistant protective layer, provided on the back side of said support, opposite to said thermofusible ink layer.

15. The thermal image transfer recording medium as claimed in claim 1, wherein said support has a thickness ranging from about 2 to 16 $\mu$m.

* * * * *

UNITED STATES PATENT AND TRADEMARK OFFICE

CERTIFICATE OF CORRECTION

PATENT NO. : 5,250,346

DATED : October 5, 1993

INVENTOR(S) : Moriyasu Nagai, et al.

It is certified that error appears in the above-indentified patent and that said Letters Patent is hereby corrected as shown below:

Column 4, line 8, "hot-melting coating" should read--hot-melt coating--.

Signed and Sealed this

Thirteenth Day of December, 1994

Attest:

Bruce Lehman

BRUCE LEHMAN

*Attesting Officer*

*Commissioner of Patents and Trademarks*